F. G. HUGHES.
ANTIFRICTION BEARING AND SEPARATOR THEREFOR.
APPLICATION FILED JULY 11, 1917.

1,299,474.

Patented Apr. 8, 1919.

Frederick G. Hughes,
INVENTOR,

BY [signature]
ATTORNEY.

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING AND SEPARATOR THEREFOR.

1,299,474.   Specification of Letters Patent.   Patented Apr. 8, 1919.

Application filed July 11, 1917. Serial No. 179,803.

*To all whom it may concern:*

Be it known that I, FREDERICK G. HUGHES, a citizen of the United States, residing at Bristol, county of Hartford, State of Connecticut, have invented a certain new and useful Antifriction-Bearing and Separator Therefor, of which the following is a full, clear, and exact description, such as will enable others skilled in the art to which it appertains to make and use the same, reference being had to the accompanying drawings, forming part of this specification.

My invention relates to antifriction bearings and, more particularly, to an antifriction bearing and separator therefor.

In the assembling of certain types of antifriction bearings it is a common practice to assemble the antifriction members in a separator and to then push the so-assembled series of antifriction members over the raceway shoulder of one of the race members, and so into the race. Since the usual separator for the type of bearing referred to is so designed that it will hold the antifriction members in the raceway against all ordinary forces, the assembled antifriction members have to be "snapped" over the raceway shoulder with considerable force. The strains on the separator, occasioned by the "snapping," are liable to permanently distort and bend it, and in the case of a multipart separator, loosen its fastenings. I have devised a separator which, while it properly holds the antifriction members relative to the raceway and to each other, and facilitates the "snapping" of the antifriction members over the raceway shoulder and into the raceway, is not liable to be distorted, bent or otherwise injured in the "snapping" operation.

One object of my invention is to provide a separator which will properly hold the antifriction members and facilitate snapping and yet will be proof against injury by the strains incident to snapping.

Another object of my invention is to provide an antifriction bearing comprising a shouldered race member, a series of antifriction members, and a separator for the antifriction members, the separator being of a character to properly hold the antifriction members on the raceway and to facilitate snapping without injury to the separator.

To these ends and also to improve generally upon devices of the character indicated, my invention consists in the various matters hereinafter described and claimed.

Figure 1:
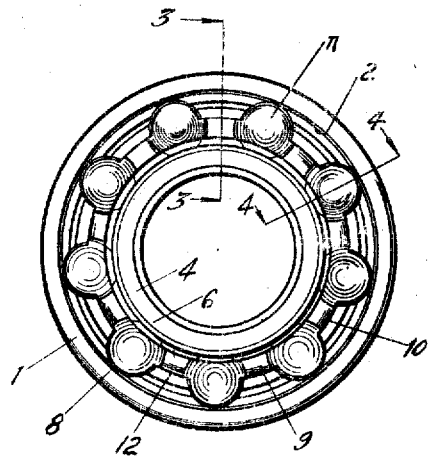
Figure 1 is a front view of a cup-and-cone ball bearing embodying my invention.
Figure 2:
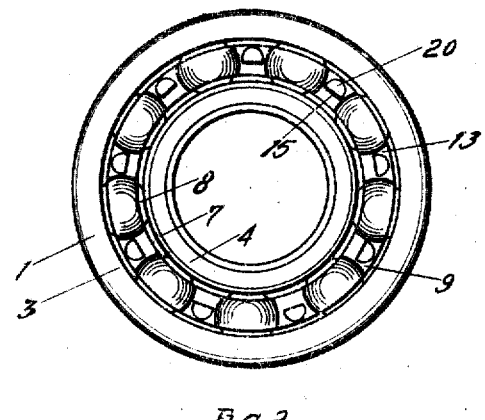
Fig. 2 is a rear view of the bearing illustrated in Fig. 1.

Without restricting my invention to bearings with raceways of the illustrated type, I show and describe it as embodied in a bearing in which the outer race member has a raceway shoulder at but one side of its raceway and the inner race member has a raceway shoulder at each side of its raceway.

The illustrated bearing comprises the outer annular race member, or cup, 1 with a raceway 2 extending crosswise of the bearing and terminated by a shoulder 3, and also comprises the inner annular race member, or cone, 4 with its raceway 5 curved crosswise of the bearing and terminated at one side by a shoulder 6 and at the other side by a shoulder 7.

Received upon the raceways 2 and 5 is a series of antifriction members 8, held assembled upon the raceways and with each other by the separator 9.

According to my invention the separator has one side, and as here illustrated both sides, constructed from somewhat resilient material, say sheet steel. And on the said one side, 10, the lips 11, which form one side of the ball-pockets, project for a very considerable distance radially beyond the circle defined by the separator material 12 that lies intermediate (circumferentially) the lips 11, so that a large part of the radial height of each lip is free of the body material 12 of the separator.

As here illustrated the outer edge of the material 12 defines a circle substantially coincident with that defined by the wall centers, and more than one-half of the radial height of the lips is free of the body material 12.

The recited construction—somewhat resilient material and a very substantial free radial length for the lips—provides: that the separator can be of the proper size, rigidity and proportions to hold the series of balls 8 in the raceway 5 against all ordinary forces so that the inner race member with the balls assembled thereon can be handled as a unit without danger of the balls and separator being disassembled from the race member; that the separator can have its pockets sufficiently small to properly guide and separate the balls; and that the separator yet can, and will, permit the snapping of the balls over the shoulder 7, without permanent distortion of the separator.

This is because, although the separator is of proper size and proportions, and its lips 11 are sufficiently rigid to not yield under forces substantially no greater than those to which the separator and assembled antifriction members and race member are subjected in ordinary handling and use, the portions of the lips which are more particularly stressed during snapping are yet sufficiently resilient to temporarily resiliently flex into abnormal positions under the stresses of snapping; and this yielding will occur before the said stresses become great enough to injure the separator by permanent distortion of any of its parts.

Figure 5:
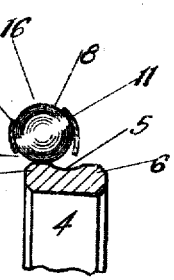
Fig. 5 is a view somewhat similar to Fig. 4 but showing a ball just being snapped over the raceway shoulder and the side of the ball pocket temporarily flexed to permit such snapping without injury to the separator.

The yielding of course takes place under the wedging action of the radially crowding balls as the balls are snapped over a shoulder, as 7 (see Fig. 5 in which a ball is shown being forced over the shoulder 7 and a lip 11 is shown resiliently flexed to its temporary abnormal position.) After the balls are over the shoulder the lips return to their unflexed, normal positions and the separator, with the tops of its pockets once more contracted, is in correct proportions to properly guide, separate and retain the balls. It will be of course understood that the pockets are so dimensioned that even when the balls are being snapped the balls are retained in the separator.

It will be noted that in a separator embodying my invention I do not have to resort to pockets giving, under normal conditions, abnormal radial freedom to the balls, i. e., pockets of abnormal free height, and which would greatly injure, if not destroy, the ability of the separator to retain the balls on the raceway and would give so much radial shift as to cause undue rattle. On the contrary I can make the ball pockets with a free height just sufficient for the very slight radial play desirable in operation, the resilient lips taking care of the abnormal radial movement necessary to permit pushing of the assembled balls over the shoulder.

Figure 3:
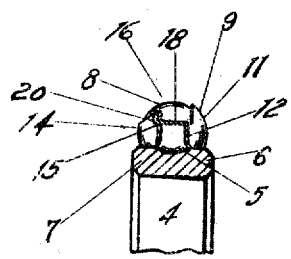
Fig. 3 is a section on line 3—3 of Fig. 1, the ball, however, being shown in full.
Figure 4:
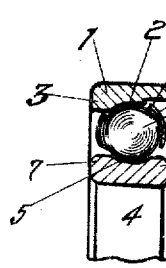
Fig. 4 is a section on line 4—4 of Fig. 1.
Figure 6:
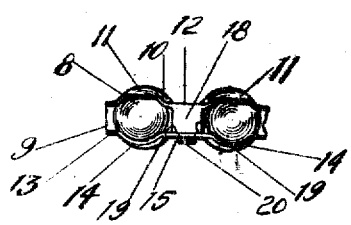
Fig. 6 is a fragmentary edge view of the separator.

The illustrated separator is composed (see Figs. 3 and 6) of two annular sections, or sides, the aforesaid side 10 and the side 13. The side 13 has, as here shown, its ball-pocket-sides 14 of less radial length than the lips 11 and between such sides and substantially on the center line of the side 13 has the slits 15. The ball pockets are portions of substantial spheres, the internal diameter of the pockets being slightly greater than the diameter of the balls to be received therein, whereby the balls are properly held, but are not grasped, by the separator. The exposure openings, for the balls, which open onto that periphery of the separator radially the more distant from the shoulder of the raceway and toward which the balls are crowded during snapping (in the present case the openings 16 in the outer periphery of the separator) are restricted in size and have each a diameter less than that of the balls to be received in the pockets. Also, the diameter of the circumferential plane of the said exposure openings is of such length that the separator and balls cannot normally pass over the raceway shoulder. This structure of course provides that the separator will retain the balls on the raceway. Of course, desirably, and as here illustrated, the exposure openings 17 of the inner periphery are also of less diameter than the balls.

There is a straight, flat, rectangular tab, or connector, 18, bent at right angles to the material 12 between each of the lips 11 and extending circumferentially substantially from one lip to the next. The tabs have their respective free ends reduced to provide shoulders 19, 19 and a wing 20. The wings 20 are passed tightly through their corresponding apertures 15 in the side 13 and, preferably, bent to lie against the outer face of such side, while the shoulders 19 abut the inner face of the side 13. Thus the wings prevent the separator from spreading and the shouldered struts 18 prevent the separator from contracting or crushing. I find the straight and uncurved connectors particularly desirable in a separator of the present type as, unlike bowed or curved connectors, they make doubly sure that the lips 11 will yield instead of the connectors stretching.

Although I have more particularly described my invention in connection with a bearing having balls for antifriction members and designed to have the antifriction members snapped into the raceway of the inner race member it will be of course understood that I do not confine my invention to bearings of the illustrated character.

It will be seen that I have provided a device of the character indicated which is not liable to be injured in the snapping operation, which at all times properly retains, guides, and separates the balls, and which withal is simple, efficient, and inexpensive to manufacture.

Having thus described my invention, what I claim as new and desire to secure by Letters Patent is:

1. A separator for antifriction members comprising sides presenting a series of spaced pockets for antifriction members, a side of said separator having its pocket-sides shaped to retain the antifriction members to be received therein but of somewhat resilient material and projecting radially beyond the material of the separator side intermediate said pocket-sides sufficiently to present a substantial portion of the radial length of each of said pocket-sides free of said intermediate material, whereby said pocket-sides, while retaining the antifriction members, can be resiliently flexed into abnormal positions, to provide for the abnormal positioning of the antifriction members to be received in said separator, without permanent distortion of the separator; substantially as described.

2. A separator for antifriction members composed of two mating sides, each presenting a series of spaced antifriction-member-pocket-sides, one of the separator sides having the material intermediate certain of its pocket-sides presenting means for connecting struts thereto. and the other separator side presenting struts intermediate certain of its pocket-sides, projecting cross-wise of the separator, and connected to the said means of the other side; one of said separator sides being somewhat resilient and having the marginal circle defined by one of the peripheral edges of the material intermediate its pocket-sides substantially coincident with that defined by the ends of the rotational axes of the antifriction members to be received in said pockets, the pocket-sides of such separator side projecting beyond the circle defined by the intermediate material for substantially one-half of their respective radial lengths; substantially as described.

3. A separator for antifriction members composed of two mating sides, each presenting a series of spaced antifriction-member-pocket-sides, one of the separator sides having the material intermediate certain of its pocket-sides presenting apertures for passing struts there-through, and the other separator side presenting straight struts intermediate certain of its pocket-sides, projecting crosswise of the separator, and having shouldered ends presenting wings, such ends abutting the other separator side with their shoulders and the wings being passed through said apertures and bent down; one of said separator sides being somewhat resilient and having the marginal circle defined by one of the peripheral edges of the material intermediate its pocket-sides substantially coincident with that defined by the ends of the rotational axes of the antifriction members to be received in said pockets, the pocket-sides of such separator sides projecting beyond the circle defined by the intermediate material for substantially one-half of their respective radial lengths; substantially as described.

4. A separator for antifriction members composed of two mating sides of sheet metal, each formed to present a series of spaced antifriction-member-pocket-sides, and one of said separator sides having the material intermediate certain of its pocket-sides presenting means substantially along its center line for the connecting of struts thereto; the other separator side being somewhat resilient and having struts formed from the material intermediate certain of its pocket-sides, projecting cross-wise of the separator, and connected to the said means of the other side, the marginal circle defined by one of the peripheral edges of such intermediate material being substantially coincident with that defined by the rotational axes of the antifriction members to be received in said pockets, and the pocket-sides of such separator side projecting beyond the circle defined by the intermediate material for substantially one-half of their respective radial lengths; substantially as described.

5. In a ball bearing, an annular race member having a raceway with a shoulder at its side, a series of balls traveling on said raceway, and a separator for said balls comprising two mated and rigidly connected annular sides each presenting a series of parti-spherical ball-pocket-sides mated with those of the other to provide a series of parti-spherical ball pockets, receiving said balls, of slightly greater diameter than said balls, and having restricted exposure openings for the balls opening on that periphery of said separator which is the more distant, radially, from the raceway and its shoulder, said openings being of less diameter than the balls, and the diameter of the circumferential plane of said openings being of such a length that the separator and balls cannot, normally, pass over said shoulder, whereby the balls are retained on the raceway; the material of one of the sides of the separator being somewhat resilient and the pocket-sides of such side having a sufficient portion of their respective radial lengths, between the body of the side and the said restricted openings, free of the body of the side to provide that, when the balls and separator are pushed over the said shoulder in snapping and the balls crowd into said restricted openings, the said pocket-sides, while yet restricting the balls, will resiliently flex adjacent the peripheries of said openings and permit said balls to pass over said shoulder without permanent distortion of the separator; substantially as described.

6. In a ball bearing, an annular inner race member having a raceway on its outer periphery with a shoulder at its side, a series of balls traveling on said raceway, and a separator for said balls comprising two mated and rigidly connected annular sides each presenting a series of parti-spherical ball-pocket-sides mated with those of the other to provide a series of parti-spherical ball pockets, receiving said balls, of slightly greater diameter than said balls, and having restricted exposure openings for the balls opening on the outer periphery of said separator, said openings being of less diameter than the balls, and the diameter of the circumferential plane of said openings being of such a length that the separator and balls cannot, normally, pass over said shoulder, whereby the balls are retained on the raceway; the material of one of the sides of the separator being somewhat resilient and the pocket-sides of such side having a sufficient portion of their respective radial lengths, between the body of the side and the said restricted openings, free of the body of the side to provide that, when the balls and separator are pushed over the said shoulder in snapping and the balls crowd into said restricted openings, the said pocket-sides, while yet restraining the balls, will resiliently flex adjacent the peripheries of said openings and permit said balls to pass over said shoulder without permanent distortion of the separator; substantially as described.

In testimony whereof I hereunto affix my signature.

FREDERICK G. HUGHES.

It is hereby certified that in Letters Patent No. 1,299,474, granted April 8, 1919, upon the application of Frederick G. Hughes, of Bristol, Connecticut, for an improvement in "Antifriction-Bearings and Separators Therefor," errors appear in the printed specification requiring correction as follows: Page 1, line 63, strike out comma at end of the line and insert a semicolon; same page, strike out line 64; line 65, before the semicolon insert the words *the ball, however, being shown in full;* page 2, line 2, for the word "wall;" read *ball;* page 3, claim 3, line 70, second occurrence, for the word "sides" read *side;* and that the said Letters Patent should be read with these corrections therein that the same may conform to the record of the case in the Patent Office.

Signed and sealed this 6th day of May, A. D., 1919.

[SEAL.]

R. F. WHITEHEAD,
*Acting Commissioner of Patents.*

Cl. 64—59